Figure 1:
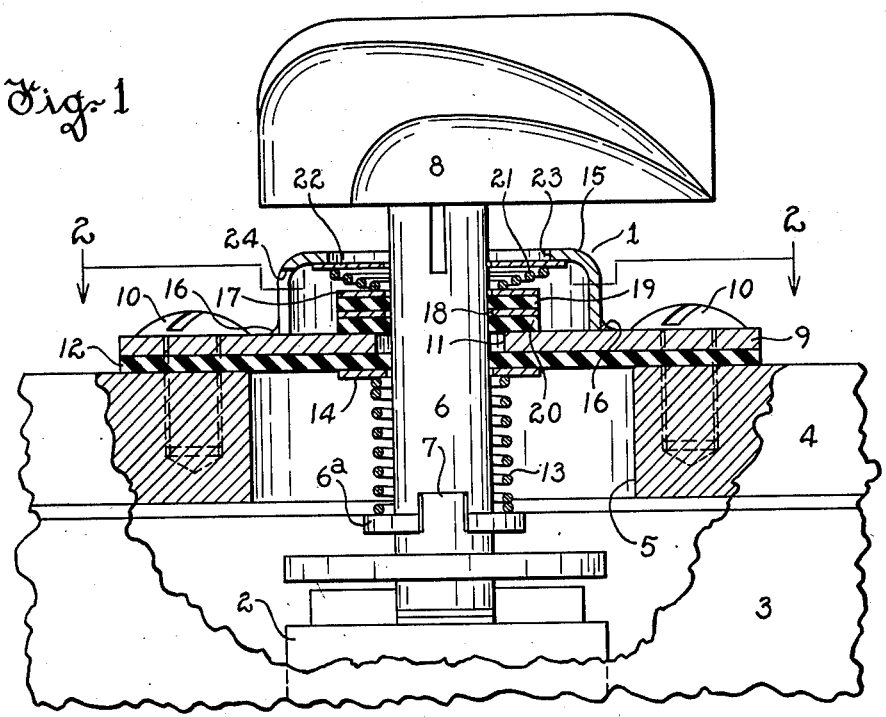

May 26, 1953     C. F. ROBBINS     2,639,928

SEALING DEVICE

Filed May 16, 1949

Inventor
Clyde F. Robbins
By W. E. Lyon
Attorney

Patented May 26, 1953

2,639,928

UNITED STATES PATENT OFFICE 2,639,928

SEALING DEVICE

Clyde F. Robbins, Milwaukee, Wis., assignor to Cutler-Hammer, Inc., Milwaukee, Wis., a corporation of Delaware Application May 16, 1949, Serial No. 93,579

4 Claims. (Cl. 286—9)

This invention relates to sealing devices and while not limited thereto is particularly applicable to shaft seals for use in connection with enclosed control switches of the water-proof type.

The invention has among its objects to provide an improved sealing device which can be readily applied to control devices of various type for sealing of a rotatable operating shaft within an opening in a wall which separates regions of different pressures.

Another object is to provide a shaft seal which is adapted to remain tight over long periods without adjustment or replacement of its parts and which permits considerable lateral play of the shaft and also axial movement thereof without affecting its sealing action.

Another object is to provide a shaft seal which is of relatively small axial extent, which permits rotation of the shaft without substantial frictional resistance and which comprises a relatively small number of parts which can be readily manufactured and assembled at low cost.

Various other objects and advantages of the invention will hereinafter appear.

The accompanying drawing illustrates an embodiment of the invention which will now be described, it being understood that various modifications may be made in the embodiment illustrated without departing from the spirit and scope of the appended claims.

Figure 2:
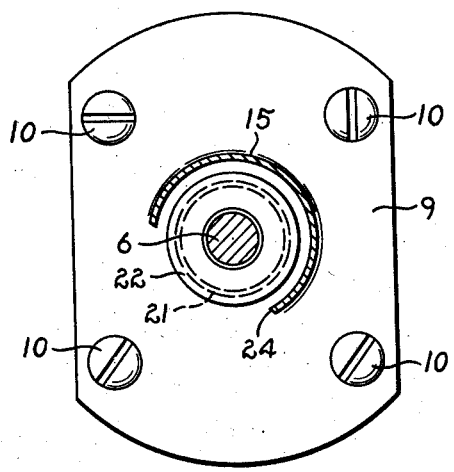

In the drawing,

Figure 1 is a fragmentary view partly in section of an enclosed drum type controller having a shaft sealing device embodying the invention associated therewith, and Fig. 2 is a sectional view on line 2—2 of Fig. 1.

Referring to Fig. 1, a sealing device 1 embodying the invention is shown in connection with a drum type controller including a rotatable contact drum 2 which is mounted within an enclosing casing 3 having a removable front cover member 4. Drum 2 is removable from casing 3 through an opening 5 in cover member 4 and as is the usual practice said casing contains stationary contacts (not shown) to be engaged by said drum. Drum 2 is provided with an operating shaft 6 which extends outwardly through the opening 5 in cover member 4 and in the embodiment illustrated the inner end of said shaft is detachably connected to the upper end of said drum by a tongue and groove operating connection 7 while the outer end thereof has an operating handle 8 fixed therto.

The sealing device 1 is provided with a base plate 9 which covers the opening 5 in cover member 4 and is provided with an enlarged opening 11 for receiving shaft 6. Base plate 9 is secured to the front side of cover member 4 by screws 10 and has an elastic gasket 12 which is formed of rubber-like material such as "neoprene" interposed between the same and said cover member to provide a tight joint therebetween. Shaft 6 is held in engagement with the upper end of drum 2 by a spring 13 held under compression between a flange 6ª formed on the inner end of said shaft and a washer 14 which abuts the inner side of gasket 12.

An inverted cup-shaped member 15 is secured to the front face of base plate 9 by a weld 16. Cup member 15 contains a pair of metal sealing washers 17 and 18 having a close running fit upon shaft 6 and a pair of elastic sealing washers 19 and 20 which fit snugly about said shaft and which are formed of rubber like material such as "neoprene." The metal washers 17 and 18 and elastic washers 19 and 20 are arranged alternately upon shaft 6 with the elastic washer 20 exposed for engagement with the front face of base plate 9. Said sealing washers are pressed together between base plate 9 and the front end of cup member 15 by a conical spring 21 which is held under compression between sealing washer 17 and a washer 22 which abuts the front end of cup member 15. Sealing washers 17 to 20 and spring 21 are inserted into cup member 15 through an enlarged opening 23 in the front end thereof and washer 22 is inserted into said cup member through an opening 24 in the side wall thereof.

As will now be set forth, the above described sealing unit provides a tight seal for shaft 6 when casing 3 is subjected to external fluid pressure such as in the case when the switch is completely submerged in a fluid. As is apparent, the several sealing washers 17 to 20 are pressed together against the front face of base plate 9 by such external pressure within cup member 15 and also by the biasing force of spring 21 to prevent leakage between the opposing faces of said washers and also between base plate 9 and the elastic washer 20. Normally both of the elastic washers 19 and 20 fit snugly around shaft 6 to prevent leakage along the same. Thus since leakage cannot occur between the opposing faces of washers 17 to 20 or between the latter washer and base plate 9 both of the elastic washers 19 and 20 normally provide for sealing of shaft 6.

In the event of lateral play of shaft 6 the inner elastic washer 20 is likely to be distorted so that the same is not maintained in tight sealing engagement with said shaft. However, the outer elastic washer 19 is confined between the metal washers 17 and 18 so that the same moves laterally with shaft 6 to maintain a tight seal for said shaft upon lateral play thereof. As is apparent, the above described sealing device permits axial movement of shaft 6 and acts upon such movement to maintain a tight seal therefor.

It is, of course, apparent that the number of elastic and metal sealing washers employed in the above described device can be increased if desired. Also as is apparent, the base member 9 may constitute a wall of the enclosing casing.

What I claim as new and desire to secure by Letters Patent is:

1. The combination with a wall separating regions of different pressures and a shaft extending through an opening in said wall, of a stack of alternately arranged elastic washers having inner and outer peripheries and rigid washers mounted upon said shaft on the pressure side of said wall to form a seal, said rigid washers having a close running fit upon said shaft and said elastic washers having their inner peripheries fitting snugly about said shaft and having their outer peripheries exposed to the higher of the different pressures to afford a closer fit between said shaft and said washers with one of said elastic washers being exposed for engagement with said wall, and spring means pressing said washers to maintain the opposing faces thereof in sealing engagement and to maintain said exposed elastic washer in sealing engagement with said wall, said exposed elastic washer permitting lateral play of said shaft within the opening in said wall and the other of said elastic washers upon such play of said shaft being movable laterally therewith and being confined between said rigid washers to maintain the same in tight sealing engagement with said shaft.

2. The combination with a wall separating regions of different pressures and a shaft extending through an opening in said wall, of a pair of elastic washers having inner and outer peripheries and a pair of rigid washers stacked alternately upon said shaft on the pressure side of said wall, said rigid washers having a close running fit upon said shaft and said elastic washers having their inner peripheries fitting snugly about said shaft and having their outer peripheries exposed to the higher of the different pressures to afford a closer fit between said shaft and said washers with one of said elastic washers being exposed for engagement with said wall, and spring means pressing said washers together and holding said exposed elastic washer in sealing engagement with said wall, said elastic exposed washer being distortable laterally in the event of lateral play of said shaft and the other of said elastic washers upon such play of said shaft being movable laterally with said shaft and being confined against lateral distortion between said rigid washers to maintain the same in tight sealing engagement with said shaft.

3. The combination with a control device including an enclosing casing subjected to external fluid pressure and an operating shaft extending outwardly through an opening in said casing, of a sealing device for said shaft including a base plate secured to the outer side of said enclosing casing and having an opening therein for receiving said shaft, of a stack of alternately arranged elastic washers having inner and outer peripheries and rigid washers mounted upon said shaft to provide a seal between the same and the outer face of said base plate, said rigid washers having a close running fit upon said shaft and said elastic washers having their inner peripheries fitting snugly about said shaft and having their outer peripheries exposed to the external fluid pressure to afford a closer fit between said shaft and said washers with one of said elastic washers exposed for engagement with the outer face of said base plate and at least one of the other elastic washers being movable laterally with said shaft, a cup shaped enclosure for said sealing washers fixed to said base plate and having an end wall provided with an opening for receiving said shaft and a spring interposed between said stack of washers and the end wall of said enclosure for pressing said washers together and for holding said exposed elastic washer in sealing engagement with said base plate.

4. The combination with a device including an enclosing casing subjected to external fluid pressure, and an operating shaft extending outwardly through an opening in said casing, of a sealing device for said shaft including a base plate secured to the outer side of said enclosing casing and having an opening therein for receiving said shaft, a stack of alternately arranged elastic washers and rigid washers mounted upon said shaft to provide a seal between the same and the outer face of said base plate, said rigid washers having a close running fit upon said shaft and said elastic washers fitting snugly about said shaft with one exposed for engagement with the outer face of said base plate, a cup-shaped enclosure for said sealing washers fixed to said base plate and having an end wall provided with an enlarged opening for receiving said washers, a spring retaining member insertable through a side opening in said cup member for engaging the end wall of said cup member and a spring held under compression between said stack of washers and said spring retaining member for pressing said washers together and for holding said exposed elastic washer in sealing engagement with the front face of said base plate.

CLYDE F. ROBBINS.

References Cited in the file of this patent

UNITED STATES PATENTS

| Number | Name | Date |
|---|---|---|
| 1,187,527 | Houser | June 20, 1916 |
| 1,505,431 | Rollins | Aug. 19, 1924 |
| 2,182,034 | Von Oberstadt | Dec. 5, 1939 |
| 2,267,183 | Williams | Dec. 23, 1941 |

FOREIGN PATENTS

| Number | Country | Date |
|---|---|---|
| 22,239 | Great Britain | Dec. 7, 1900 |
| 229,181 | Great Britain | Feb. 19, 1925 |